(12) United States Patent
Park

(10) Patent No.: US 9,482,258 B2
(45) Date of Patent: Nov. 1, 2016

(54) FASTENER WITH MULTIPLE THREADED REGIONS

(75) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 13/468,861

(22) Filed: May 10, 2012

(65) Prior Publication Data

US 2013/0302110 A1    Nov. 14, 2013

(51) Int. Cl.
*F16B 25/00* (2006.01)
*F16B 35/06* (2006.01)

(52) U.S. Cl.
CPC ....... *F16B 25/0036* (2013.01); *F16B 25/0015* (2013.01); *F16B 25/0063* (2013.01); *F16B 25/0068* (2013.01); *F16B 25/0073* (2013.01); *F16B 35/065* (2013.01)

(58) Field of Classification Search
CPC ............ F16B 25/0036; F16B 25/0073; F16B 35/065; F16B 25/0015; F16B 25/0068; F16B 25/0063
See application file for complete search history.

(56) References Cited

U.S. PATENT DOCUMENTS

| | | | | |
|---|---|---|---|---|
| 373,074 | A | * | 11/1887 | Jones ............................. 411/386 |
| 430,236 | A | | 6/1890 | Rogers |
| 466,463 | A | | 1/1892 | Holland |
| 470,804 | A | | 3/1892 | Jones |
| 684,774 | A | | 10/1901 | Baggs |
| 867,552 | A | | 10/1907 | Bradford et al. |
| 1,396,455 | A | | 11/1921 | Moore |
| 1,830,554 | A | * | 11/1931 | McMullin ..................... 411/399 |
| 2,263,137 | A | | 11/1941 | Louis |
| 2,869,224 | A | | 1/1959 | Forster |
| 3,258,797 | A | | 7/1966 | Budd |
| 3,478,369 | A | | 11/1969 | Joseph |
| 3,478,639 | A | | 11/1969 | Gruca |
| 3,661,046 | A | | 5/1972 | Waud et al. |

(Continued)

FOREIGN PATENT DOCUMENTS

| | | |
|---|---|---|
| AU | 494077 | 10/1977 |
| CA | 110265 | 4/2007 |

(Continued)

OTHER PUBLICATIONS

International Search Report & The Written Opinion of the International Searching Authority dated Jul. 25, 2013, International Application No. PCT/US2013/040592.

(Continued)

*Primary Examiner* — Gary Estremsky
(74) *Attorney, Agent, or Firm* — Vierra Magen Marcus LLP

(57) ABSTRACT

A fastener includes a shank having a point at a first end and a second, head end. A first helical thread region is formed at the first end adjacent to the point and has having a first helical thread having a first effective diameter. A sub-region of a second helical thread formed within the first helical thread region adjacent to the first end. A head at the second end includes a cutting structure, the cutting structure positioned to intersect a bottom surface of the disk and the shank, the cutting structure has a square cross-section formed by four walls intersecting the disk. A third helical thread region may be provided between the first region and the head. The shank diameter in the sub-region and the first region is smaller than the other regions.

19 Claims, 4 Drawing Sheets

(56) References Cited

U.S. PATENT DOCUMENTS

| | | | |
|---|---|---|---|
| 3,682,507 A | 8/1972 | Waud | |
| 3,703,843 A * | 11/1972 | Laverty | 411/413 |
| 3,706,843 A * | 12/1972 | Laub | 348/424.1 |
| RE28,111 E * | 8/1974 | Laverty | 411/412 |
| 3,903,784 A * | 9/1975 | Dekker | 411/399 |
| 4,016,795 A | 4/1977 | Gill | |
| 4,034,641 A | 7/1977 | Williams, Jr. et al. | |
| 4,329,099 A | 5/1982 | Shimizu et al. | |
| 4,541,270 A | 9/1985 | Hanslik | |
| 4,653,244 A | 3/1987 | Farrell | |
| 4,655,661 A * | 4/1987 | Brandt | 411/387.1 |
| 4,834,602 A | 5/1989 | Takasaki | |
| 4,874,278 A | 10/1989 | Kawashita | |
| 4,878,793 A | 11/1989 | Hewison | |
| 5,015,134 A | 5/1991 | Gotoh | |
| 5,044,855 A | 9/1991 | Fukubayashi | |
| 5,141,376 A | 8/1992 | Williams et al. | |
| 5,199,839 A | 4/1993 | DeHaitre | |
| 5,209,753 A | 5/1993 | Biedermann et al. | |
| 5,482,418 A | 1/1996 | Giannuzzi | |
| 5,509,370 A | 4/1996 | Kovacs et al. | |
| 5,516,248 A | 5/1996 | DeHaitre | |
| 5,536,127 A | 7/1996 | Penning | |
| 5,570,983 A | 11/1996 | Hollander | |
| 5,772,376 A * | 6/1998 | Konig | 411/399 |
| 5,779,417 A | 7/1998 | Barth et al. | |
| 5,827,030 A | 10/1998 | Dicke | |
| 5,895,187 A | 4/1999 | Kuo-Tai | |
| 5,897,280 A | 4/1999 | Dicke | |
| 5,987,837 A | 11/1999 | Nelson | |
| 6,000,892 A | 12/1999 | Takasaki | |
| 6,050,765 A | 4/2000 | McGovern et al. | |
| 6,056,491 A | 5/2000 | Hsu | |
| 6,065,919 A | 5/2000 | Peck | |
| RE36,741 E | 6/2000 | Walther et al. | |
| 6,086,302 A | 7/2000 | Gerhard | |
| 6,086,303 A | 7/2000 | Fluckiger | |
| 6,109,850 A | 8/2000 | Commins | |
| 6,227,430 B1 | 5/2001 | Rosen et al. | |
| 6,296,433 B1 | 10/2001 | Forsell et al. | |
| 6,302,631 B1 * | 10/2001 | Takasaki et al. | 411/399 |
| 6,328,516 B1 | 12/2001 | Hettich | |
| 6,332,741 B1 | 12/2001 | Janusz | |
| 6,394,723 B1 * | 5/2002 | Cassel | 411/188 |
| 6,398,785 B2 | 6/2002 | Carchidi et al. | |
| 6,514,026 B1 | 2/2003 | Gerhard | |
| 6,558,097 B2 | 5/2003 | Mallet et al. | |
| 6,616,391 B1 | 9/2003 | Druschel | |
| 6,644,904 B2 | 11/2003 | Chen et al. | |
| 6,666,638 B2 | 12/2003 | Craven | |
| 6,698,987 B1 | 3/2004 | Dicke | |
| 6,789,991 B2 | 9/2004 | Hsu | |
| 6,854,942 B1 | 2/2005 | Hargis | |
| 6,941,635 B2 | 9/2005 | Craven | |
| 6,976,818 B2 | 12/2005 | Levey et al. | |
| 7,037,059 B2 | 5/2006 | Dicke | |
| 7,090,453 B2 | 8/2006 | Lin | |
| 7,101,133 B2 | 9/2006 | Dicke | |
| 7,163,366 B2 | 1/2007 | Chen | |
| 7,293,947 B2 * | 11/2007 | Craven | 411/387.2 |
| 7,402,016 B2 | 7/2008 | Yin-Feng | |
| 7,604,445 B1 * | 10/2009 | Dicke | 411/399 |
| 7,677,854 B2 | 3/2010 | Langewiesche | |
| 7,682,118 B2 | 3/2010 | Gong et al. | |
| 7,740,435 B2 | 6/2010 | Gstach et al. | |
| 7,862,279 B2 | 1/2011 | Stiebitz et al. | |
| RE42,207 E | 3/2011 | Janusz | |
| 8,015,773 B2 | 9/2011 | Habermehl | |
| 8,182,185 B2 | 5/2012 | Gahn et al. | |
| 8,182,186 B2 | 5/2012 | Huber et al. | |
| 8,192,123 B2 * | 6/2012 | Ernst et al. | 411/387.1 |
| 8,231,320 B2 | 7/2012 | Hettich | |
| 8,348,571 B2 | 1/2013 | Shih | |
| 8,360,702 B2 | 1/2013 | Yu | |
| 8,430,618 B2 | 4/2013 | Baer et al. | |
| 2002/0114682 A1 | 8/2002 | Forster | |
| 2003/0026675 A1 | 2/2003 | McGovern et al. | |
| 2003/0231941 A1 | 12/2003 | Kenny | |
| 2003/0235483 A1 | 12/2003 | Chen | |
| 2004/0141827 A1 | 7/2004 | Dicke | |
| 2004/0197139 A1 | 10/2004 | McGovern et al. | |
| 2005/0079031 A1 | 4/2005 | Mizuno et al. | |
| 2006/0269380 A1 | 11/2006 | Yin-Feng | |
| 2007/0055236 A1 | 3/2007 | Hudgins et al. | |
| 2007/0128001 A1 | 6/2007 | Su | |
| 2007/0166124 A1 | 7/2007 | Hsu | |
| 2007/0217887 A1 * | 9/2007 | Lin | 411/413 |
| 2007/0224019 A1 | 9/2007 | Hale | |
| 2007/0237606 A1 | 10/2007 | Takasaki | |
| 2007/0286701 A1 | 12/2007 | Hsu | |
| 2008/0080951 A1 | 4/2008 | Lin | |
| 2008/0124187 A1 | 5/2008 | Haytayan | |
| 2009/0092463 A1 | 4/2009 | Oberndorfer et al. | |
| 2009/0112269 A1 | 4/2009 | Lieberman et al. | |
| 2009/0123253 A1 | 5/2009 | Hettich | |
| 2009/0155020 A1 | 6/2009 | Versino et al. | |
| 2009/0162165 A1 | 6/2009 | Chen | |
| 2010/0047035 A1 | 2/2010 | Rosenkranz et al. | |
| 2011/0110745 A1 | 5/2011 | Shih | |
| 2011/0217145 A1 | 9/2011 | Kochheiser et al. | |
| 2011/0280684 A1 | 11/2011 | Lai | |
| 2012/0251268 A1 | 10/2012 | Yu | |
| 2012/0294693 A1 | 11/2012 | Gonciarz et al. | |
| 2013/0039720 A1 | 2/2013 | Shih | |
| 2014/0023455 A1 | 1/2014 | Park | |
| 2014/0294534 A1 | 10/2014 | Park | |

FOREIGN PATENT DOCUMENTS

| | | | |
|---|---|---|---|
| CA | 2647663 A1 | 6/2010 | |
| DE | 8329783 U1 | 6/1985 | |
| DE | 4228727 A1 | 3/1994 | |
| DE | 4439535 A1 | 5/1996 | |
| DE | 29621922 U | 4/1998 | |
| DE | 19846993 A1 | 4/2000 | |
| DE | 102004018069 A1 | 8/2004 | |
| DE | 202004011145 U1 | 9/2004 | |
| DE | 202005006493 U1 | 6/2005 | |
| DE | 102005039744 A1 | 3/2007 | |
| DE | 10 2008048703 A1 | 3/2010 | |
| DE | 10 2008057678 A1 | 5/2010 | |
| DE | 202010016409 U | 2/2011 | |
| DE | 20 2011100618 U1 | 9/2011 | |
| EP | 0012441 A1 | 6/1980 | |
| EP | 0319812 A1 | 6/1989 | |
| EP | 1411252 A2 | 4/2004 | |
| EP | 1990551 A2 | 11/2008 | |
| EP | 2092995 A2 | 8/2009 | |
| EP | 2289647 A1 | 3/2011 | |
| EP | 2317159 A1 | 5/2011 | |
| GB | 2227540 A | 8/1990 | |
| GB | 2235744 A | 3/1991 | |
| JP | 2002039134 A | 2/2002 | |
| JP | 2002349528 A | 12/2002 | |
| WO | 93/23680 | 11/1993 | |
| WO | 99/17908 | 4/1999 | |

OTHER PUBLICATIONS

English Abstract of European Publication No. EP2317159 published on May 4, 2011.

English Abstract of German Publication No. DE102008048703 published on Mar. 25, 2010.

English Abstract of German Publication No. DE102008057678 published on May 20, 2010.

English Abstract of German Publication No. DE202011100618 published on Oct. 27, 2011.

GRK Fasteners, Pheinox, R4, Stainless Steel Screw, product page [retrieved from company website on Jan. 2011]: http://www.grkfasteners.com/index.php/en/products/r4/pheinox-r4.

Muro, Cement Board Screws, product page [retrieved from company website on Jan. 2011]: http://www.muro.com/screws.htm.

(56) References Cited

OTHER PUBLICATIONS

ITW, Buildex Tapcon Concrete Anchor, [retrieved from company website on Jan. 2011]: http://www.tapcon.com/concreteAnchor.asp.
Qingdao Hiron Nails Co., Ltd, EG Ardox Spiral Nails, product page [retrieved from website on Jan. 2011]: http://nails.china-direct-buy.com/v/4/product_detail/5057955/EG__ARDOX__SPIRAL__NAILS.html&usg=_DXV10Ll3dViaLC3GP157GZyoCMI=&h=.
Schmid Schrauben Hainfeld GMBH, Rapid Komprex, retrieved from website on Sep. 14, 2013: http://www.schrauben.at/files/rapid_komprex.pdf.
DIBT, Approval communication for Reg. No. Z-9.1-564, Jul. 1, 2008.
International Search report and Written Opinion dated Oct. 2, 2013, in International Appl. No. PCT/US2013/051704 filed Jul. 23, 2013.
International Search report and Written Opinion dated Jul. 1, 2014, in International Appl. No. PCT/US2014/031324 filed Mar. 20, 2014.
Office Action dated Aug. 21, 2014, in U.S. Patent Appl. No. 13/948,737 filed Jul. 23, 2013.
International Preliminary Report on Patentability dated Nov. 11, 2014, in International Application No. PCT/US2013/040592 filed May 10, 2013.
Amendment dated Feb. 23, 2015, in U.S. Appl. No. 13/948,737 filed Jul. 23, 2013.
Amendment dated Jun. 29, 2015, in European Application No. 13724139.4 filed May 10, 2013.
Examination Report dated Sep. 11, 2015, in New Zealand Application No. 702550 filed May 10, 2013.
Amendment dated Apr. 8, 2016, in New Zealand Application No. 702550 filed May 10, 2013.
Amendment dated Apr. 21, 2016, in Japanese Patent Application No. 2015-511768 filed May 10, 2013.
Office Action dated May 15, 2016, in New Zealand Patent Application No. 702550 filed May 10, 2013.
Office Action dated Jun. 7, 2016, in Australian Patent Application No. 2013259288 filed May 10, 2013.
Amendment dated Aug. 5, 2016, in New Zealand Patent Application No. 702550 filed May 10, 2013.
Office Action dated Aug. 4, 2016, in U.S. Appl. No. 13/848,722, filed Mar. 21, 2013.
Amendment dated Jul. 22, 2016, in U.S. Appl. No. 13/848,722, filed Mar. 21, 2013.
Communication Rule 71(3) EPC intention to grant, dated Jul. 18, 2016, in European Patent Application No. 13724139.4 filed May 10, 2013.
Office Action dated Aug. 12, 2016, in U.S. Appl. No. 14/536,071, filed Nov. 7, 2014.

\* cited by examiner

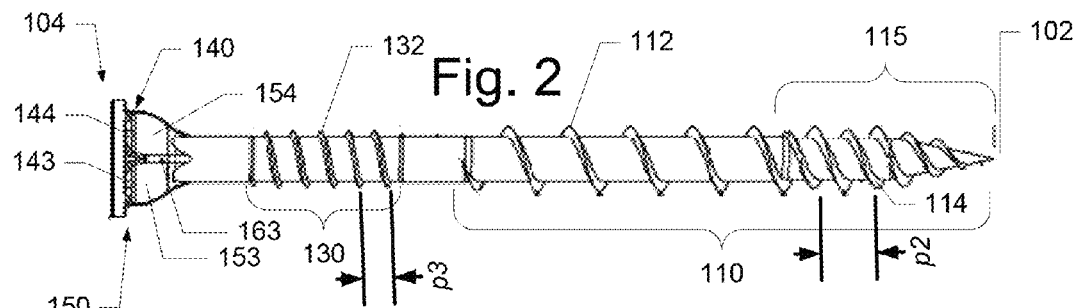
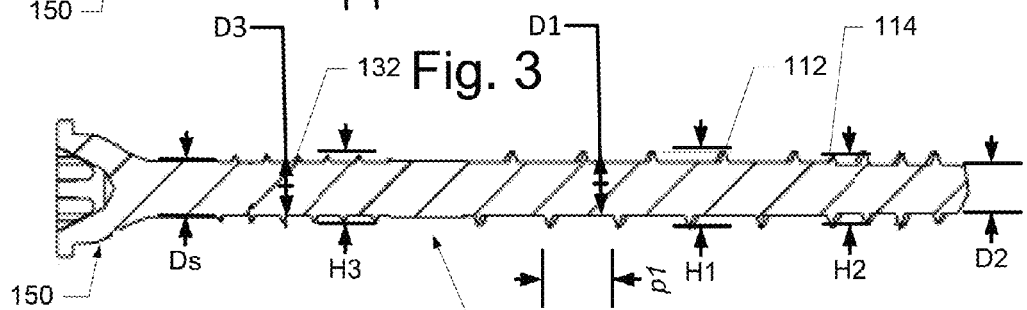
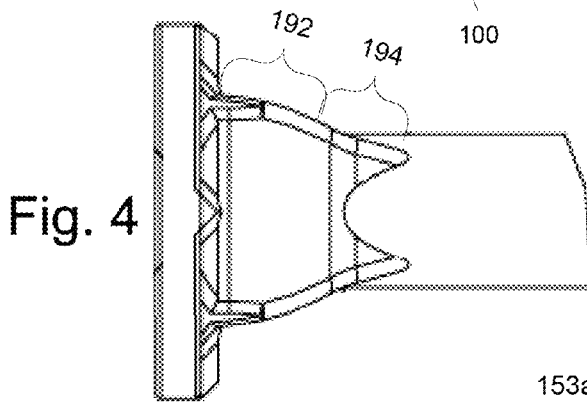
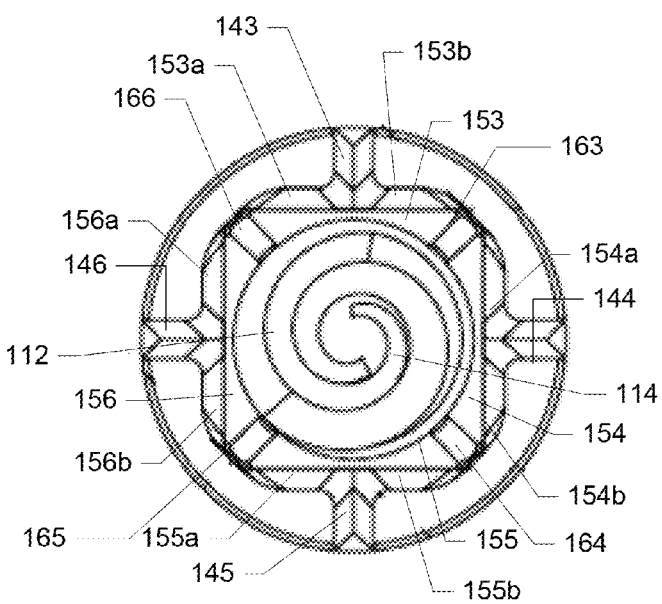
Fig. 2
Fig. 3
Fig. 4
Fig. 5

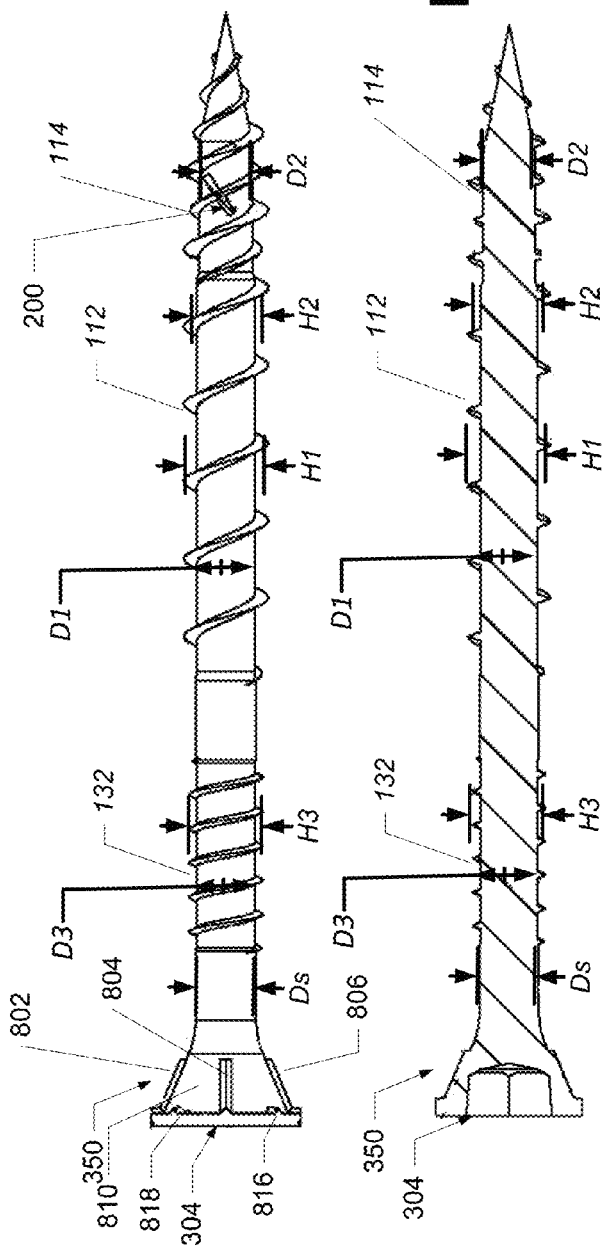

FASTENER WITH MULTIPLE THREADED REGIONS

BACKGROUND

Variations in fastener design have been used to improve different characteristics and performance of fasteners depending on the intended use of the fastener. In general, a screw-type fastener includes a threaded shank with a pointed tip at one end thereof and a head at the other end. The head has a recess for accepting a driver tip.

Most types of screw fasteners are designed to be driven completely into a material, so that the head bottom or top is flush with a surface of the material. In wood screws having a conical head, the turning torque increases with both the depth of the screw in the wood and when the conical head begins to penetrate into the surface of the wood. This makes it difficult to completely drive the screw into the wood.

SUMMARY

Technology is described herein which comprises a fastener having elements allowing securing elements in wood, composite or other material and providing an improved counter-sunk head. The fastener includes a shank having a point at a first end and a second, head end. A first helical thread region is formed at the first end adjacent to the point and has having a first helical thread having a first effective diameter. A sub-region of a second helical thread formed within the first helical thread region adjacent to the first end. A head at the second end includes a top portion such as a disk and a cutting structure, the cutting structure positioned to intersect a bottom surface of the disk and the shank, the cutting structure has a square cross-section formed by four walls intersecting the disk. A third helical thread region may be provided between the first region and the head. The shank diameter in the sub-region and the first region is smaller than the other regions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 depicts a plan view of a first embodiment of a fastener in accordance with the present technology.

FIG. 3 depicts a partial, cross-sectional view of a first embodiment of a fastener in accordance with the present technology.

FIG. 4 depicts a partial cross-sectional view of the head of a first embodiment of a fastener in accordance with the present technology.

FIG. 5 depicts an end view of a first embodiment of a fastener in accordance with the present technology.

FIG. 8 depicts another embodiment of the fastener in accordance with the present technology.

FIG. 9 depicts a cross-sectional view of the embodiment of FIG. 8.

FIG. 10 is an enlarged view of the head 350 of the embodiment of FIG. 8.

FIG. 11 is a cross-sectional view along line b-b in FIG. 10.

FIG. 12 is an end view of the fastener shown in FIGS. 8-11.

DETAILED DESCRIPTION

Figure 1:
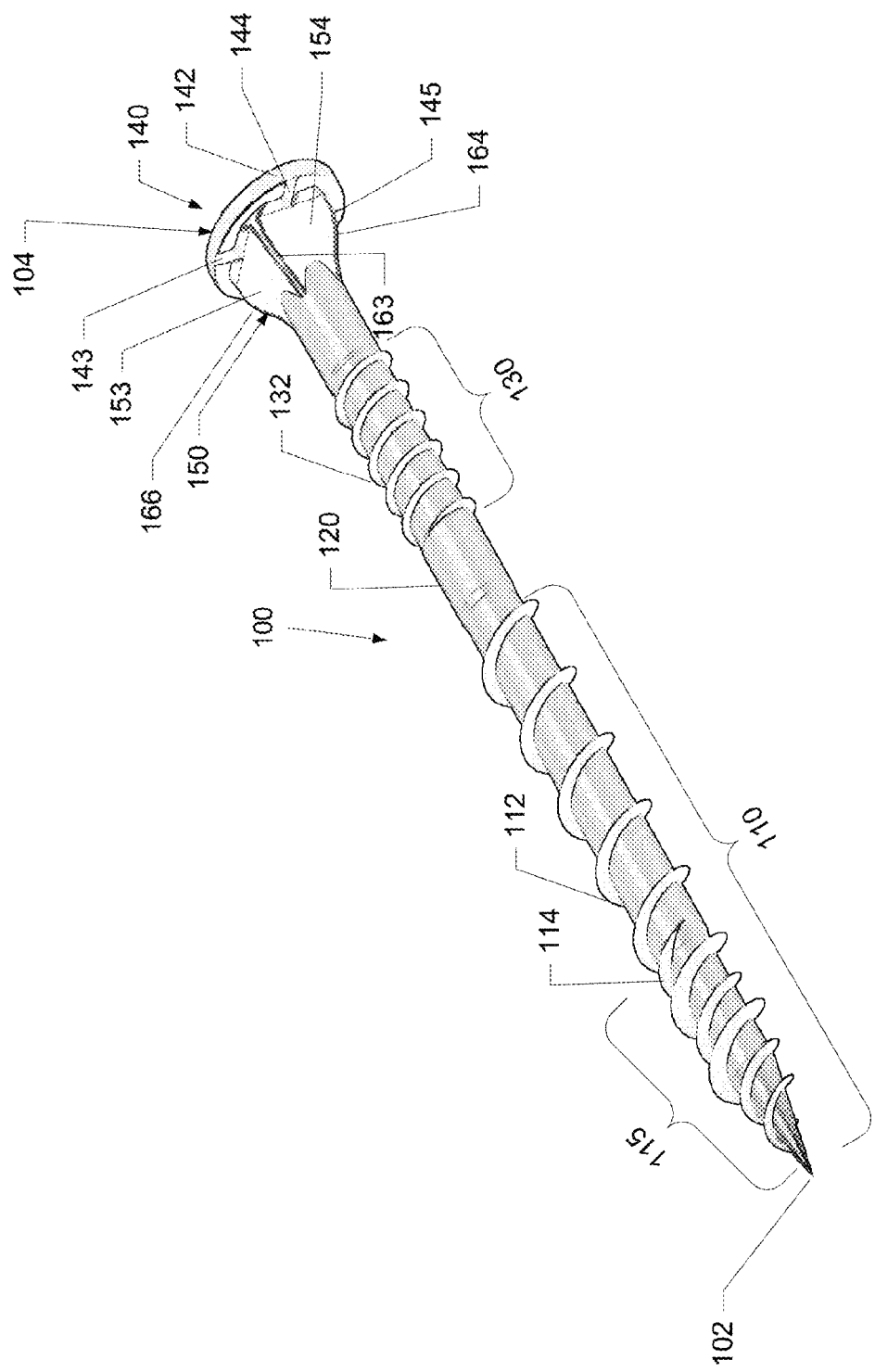
FIG. 1 depicts a perspective view of a first embodiment of a fastener in accordance with the present technology.

The technology described herein is a fastener having elements allowing securing elements in wood, composite or other material and providing an improved counter-sunk head. The fastener requires less torque than a fastener having a completely threaded shaft and improves the ability of the head to the screw to enter the fastened material so that a surface of the screw is flush with a surface of the material.

A first embodiment of the fastener technology will be described with respect to FIGS. 1-5.

The fastener of FIGS. 1-5 includes a shank 100 having a pointed tip 102 at one end thereof and a head 104 at another end. The shank may be formed of galvanized steel. The body of the shank has a base shank diameter Ds. A first region 110 of the shank includes a first helical thread 112 formed on the shank 100. The first region extends from adjacent to pointed tip 102 to an intermediate point adjacent to a spacer 120. The shank in the first region has a shank diameter D1 which is smaller than Ds. The first thread 112 has an effective diameter H1, with a first thread height above the shank in the first region ($(H1-D1)/2$) and a pitch Pa. The first region 110 includes a sub-region 115 with a second thread 114 formed on the shank, of a shorter thread length (smaller number of turns) and interspersed with the first helical thread 112 The shank has a shank diameter D2 in the second region which is smaller than diameter D1. The second thread 114 has smaller effective diameter H2 than diameter H1 of the first helical thread 112, has a second thread height (($H2-D2)/2$) and has a pitch P2 which matches the pitch P1 of the first thread 112.

A third region 130 of the shank includes a third helical thread 132. A spacer region 120 separates the third region from the first region. The shank has a shank diameter D3 in the third region which may be equivalent to or slightly larger than D1, and helical thread 132 has an effective diameter H3 smaller than H1, and larger than or equal to H2, with a third thread height (($H3-D3)/2$) above the surface of the shank. The shank has a pitch P3 which is smaller than pitch P1 or P2.

In one embodiment, the relationship between the aforementioned dimensions includes one or more of the following:

H1:H2 is in a range of about 1.3 to 1.04 and in one embodiment is in a range of about 1.2-1.05.

H1:H3 is in a range of about 1.4 to 1.03 and in one embodiment is in a range of about 1.3-1.05.

D1:D2 is in a range of about 1.25 to 1.02 and in one embodiment is in a range of about 1.15-1.05

D2:D3 is in a range of about 0.95 to 0.75 and in one embodiment is in a range of about 0.92-0.88

A head 140 is provided at the other end of the shank 100. The head comprises a top portion which may include a disk 142 having a top surface and a bottom surface. In another embodiment (not shown), the top portion of the head includes no disk but terminates in a top surface. The top surface of the head is formed to have a recess forming a Phillips socket. Note that instead of the Phillips recess, a square or other shaped recess may be formed in the top of the head 142 to receive a driver.

Below the top surface 142 is a cutting structure 150 having, in one embodiment, a generally square cross section (as viewed in FIG. 5) defined by walls 153, 154, 155, 156. The walls have a first end intersecting the shank and a second end terminating in the bottom surface of head 142 in a beveled edge. Each wall has a respective beveled edge 153a, 153b, 154a, 154b, 155a, 155b, 156a, 156b.

The bottom surface of head 142 also includes edges 143, 144, 145, 146 bisecting each beveled edge. The edges 143 have triangular cross sections and intersect with respective beveled edges 153a/153b, 154a/154b, 155a/155b, 156a/156b. In one embodiment, no beveled edges are used. Each edge 143-146 may have a beveled end opposing the wall it bisects. In another alternative, a beveled end is not used. Each wall joins an adjacent wall by a rounded edge. Walls 153 and 154 are joined at edge 163; walls 154 and 155 joined at edge 164, walls 155 and 156 joined at edge 165, and walls 156 and 157 joined at edge 166. The edges may be rounded as illustrated or comprise an angled edge. Each edge 163, 164, 165, 166 and each wall 153-157 may include a first arcuate portion 192 intersecting the disk transitioning to a second, opposing arcuate portion intersecting the shank. It should be recognized that alternative embodiments of the head may be utilized. In one embodiment, no disk is provided and the head has a polygonal or square shape with the edges forming corners of an upper surface of the head.

The screw is designed to be a self-boring screw into the material to be fastened. However, a pilot hole may be utilized.

When the screw is driven into a material, the first helical thread and second helical thread operate to pull the screw into the material as the screw is rotated an pressure applied to the bore. Because the first thread 112 has a greater effective diameter, it is responsible for more of the torque and pull of the fastener into the material. The second thread gives increased pull down as the screw starts. The second thread also provides this increased pull down with less torque by providing the thread will a shorter length than the first thread, and only in the boring region of the screw. In comparison to a fully threaded screw (one with a helix that is uniform along its entire length), the present screw requires an less torque as it bores into material due to the variation between the first and secondary thread, as well as the spacer 120. Because of the limited lengths of both the first and second regions, the tension in the screw does not increase past the first region. The first region 110 and sub-region 115 provides the main tension resisting boring of the screw into the material. But once the screw entering a surface of material enters beyond the sub-region 120, resistance due to the threads levels off since the remaining portion of the fastener is smaller than the effective diameter of the threads 112.

The third region helical thread 132 is believed to provide additional pull down as the bore may shrink into the shank as the shank enters the bore. Because the pitch of thread 132 is smaller than threads 112 and 114, and has a lower height H3, this portion of the screw pulls into the material more rapidly than the first region. The third region thus provides additional pressure near the head/material interface to pull the two materials being joined together. In an alternative embodiment, threads 132 may comprise annular rings. Finally, as the cutting structure 150 reaches the surface of the material, edges 163, 164, 165, 166 allow the head 142 of the screw to more efficiently sink into the fastened material. The edges 143, 144, 145, 146 in combination with edges 163, 164, 165, 166 allow the head 142 to sink into material so that the head is flush with a surface of a fastened material.

If the material is wood, the fastener 100 including head 142 penetrates smoothly into the wood without encountering any large turning resistance. Cracking is a major problem in wood fasteners. The edges act as drill edges and do help resist the formation of cracks in the wood. Any form of pyramid head may be utilized including any other polygonal cross-sectioned head.

Figure 6:
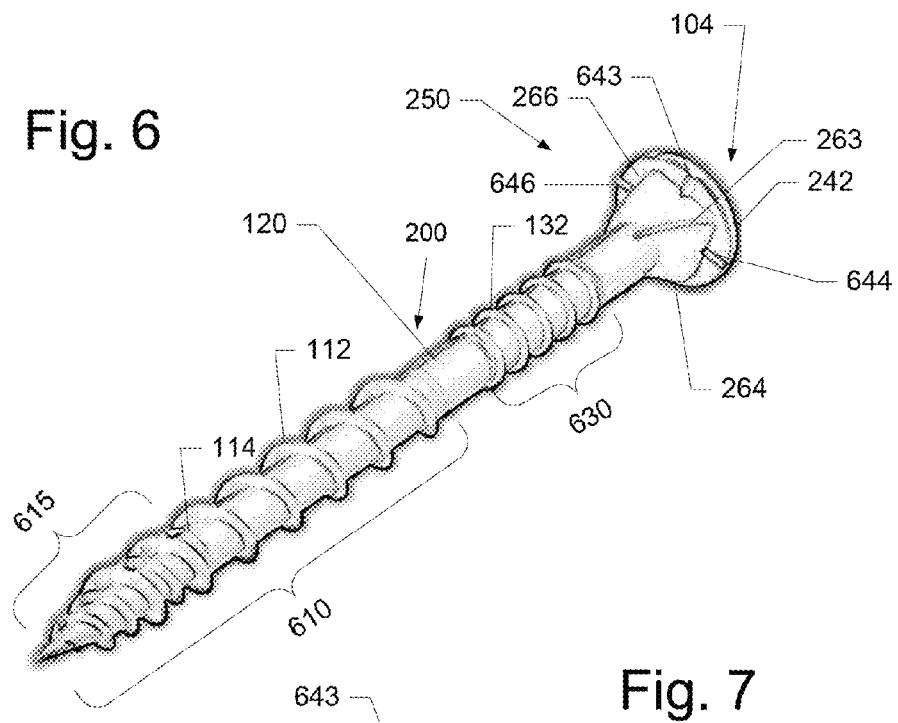
FIG. 6 depicts a perspective view of a second embodiment of a fastener in accordance with the present technology.
Figure 7:
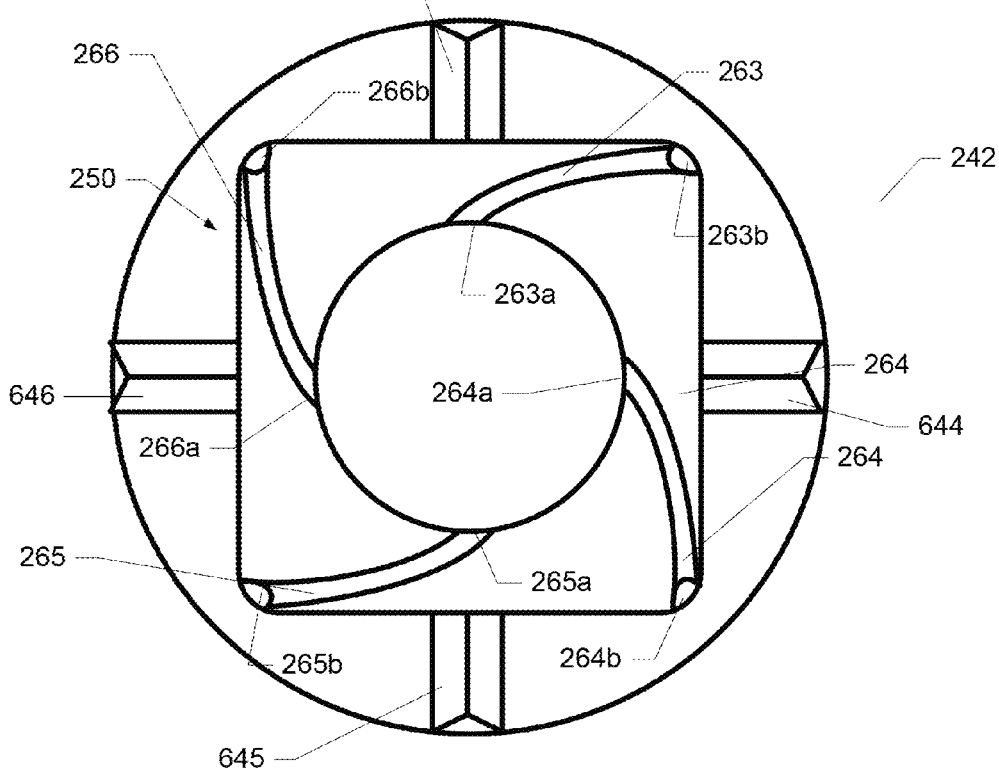
FIG. 7 depicts an end view of a second embodiment of a fastener in accordance with the present technology.

FIGS. 6 and 7 illustrate a second embodiment of the fastener 200. Fastener 200 includes a first portion 610, second, sub-region 630 and third region 630 having parameters and helical threads matching those of screw 100 illustrated and described with respect to FIGS. 1-5.

In screw 200, the cutting structure 250 has a square cross section adjacent to the disk 242. However, edges 263, 264, 265 266 are formed to have a in a one-eighth turn when viewed from the tip toward that shank. In alternative embodiments, the edges can be straight (e.g. parallel to the axis) and as large as one-half turn (where four edges are provided) or one-third turn (in an embodiment where only three edges are provided). That is, each edge 263, 264, 265 266 intersects the shank 202 at a respective location 263a, 264a, 265a, 266a, and intersects disk 242 at a second point 263b, 264b, 265b, 266b, with a continuous arcuate edge 263, 264, 265 266 therein between. Edges 263, 264, 265 266 may be rounded or angled as edges 163, 164, 165, 166. The direction of rotation is clockwise from the shank to the disk 143, and thus matches the right-hand turned helical threads in regions 610, 620, 630. Additional cutting edges 643, 644, 645, 646 are provided and have a structure and effect similar to edges 143, 144, 145, 146.

An advantage of the embodiment of screw 200 is in providing less resistance when the cutting structure 250 encounters the material surface. In the above embodiments, the ratio of the length Lh of the cutting structure to the length Ls of the fastener is in the range of 0.06-0.08 and may be about 0.07.

FIGS. 8 and 12 illustrate another embodiment of the fastener 300. Elements of fastener 300 which are similar to those in previous embodiments share like numerals. Fastener 300 includes a head 304 with a cutting structure 350 which is conical and includes edges 802, 804, 806 and 808 and notches 812, 814, 816 and 818. Edges 802, 804, 806 and 808 surround a conical body 810 while notches 812, 814, 816 and 818 are provided on the underside of disk 820. Conical body 810 is formed to intersect with shaft at an angle of approximately 23 degrees with respect to the centerline of the shaft.

Also included in the embodiments of FIGS. 8-12 is a helical ridge 200 having an exemplary pitch of, for example, 0.5 turns per inch and a diameter H4 of approximately or slightly less than H3 and intersecting the second thread 114 but not the first thread 112. This helical ridge 200 may be provided in all of the embodiments described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
    a shank having a point at a first end and a head at a second end, and having a base shank diameter, the shank including
        a first region having a first helical thread having a first effective diameter, the first region of the shank having a first continuous shank diameter, the first helical thread having a first height relative to the first diameter, and a sub-region formed in the first region and having a second helical thread having a second effective diameter, the sub-region of the shank having a second continuous shank diameter smaller than the first shank diameter, the second helical thread having a second height relative to the second diameter, the second helical thread interspersed with the first helical thread such that each thread has a pitch, the pitch of the first helical thread matching the pitch of the second helical thread;

a third region formed spaced apart from the first region and having a third helical thread having a third effective diameter, the third region of the shank having a third continuous shank diameter, the third helical thread having a third height relative to the third diameter, the third helical thread having a pitch smaller than the pitch of the first helical thread; and the head having a bottom surface and having a cutting structure, the cutting structure positioned to intersect the bottom surface and the shank.

2. The fastener of claim 1 wherein the cutting structure has a square cross-section formed by four walls intersecting the bottom surface, each wall defined by a straight edge relative to an adjacent wall.

3. The fastener of claim 1 wherein the cutting structure has a square cross-section formed by four walls intersecting the bottom surface, each wall defined by an arcuate edge relative to an adjacent wall.

4. The fastener of claim 3 wherein each arcuate edge comprises a one-eighth turn from a point intersecting the shank to a point intersecting the bottom surface.

5. The fastener of claim 3 wherein the head includes a disk having the bottom surface, the bottom surface further includes four base edges extending away from the bottom surface, each edge having a first side intersecting a middle of one of said walls, each base edge extending from the first side to an edge of the disk.

6. The fastener of claim 1 wherein the first region is positioned adjacent to the first end of the shank, the sub-region is positioned within the first region and the third region is positioned between the first region and the cutting structure.

7. The fastener of claim 6 including at least one of the following:
wherein the ratio of the first effective diameter to the second effective diameter is in a range of 1.3-1.05;
wherein the ratio of the first effective diameter to the third effective diameter is in a range of 1.3-1.04;
wherein the ratio of the first shank diameter to the second shank diameter is in a range of 1.25-1.05; or
wherein the ratio of the second shank diameter to the third shank diameter is in a range of 0.95-0.75.

8. A wood screw fastener, comprising:
a shank having a point at a first end, and a second end, and having a base shank diameter, the shank including
a first helical thread region formed at the first end and including the point having a first helical thread having a first effective diameter, the first region of the shank having a portion including a first shank diameter, the first helical thread having a first height relative to the first diameter, and a sub-region of a second helical thread formed within the first helical thread region, and to the first end, and the second helical thread having a second effective diameter, the shank in the sub-region having a continuous second shank diameter smaller than the first shank diameter, the second helical thread having a second height relative to the second diameter, the second helical thread interspersed with the first helical thread such that each thread has a pitch, the pitch of the first helical thread matching the pitch of the second helical thread;

a third region formed spaced apart from the first region and having a third helical thread having a third effective diameter, the third region of the shank having a third continuous shank diameter, the third helical thread having a third height relative to the third diameter; and a head at the second end comprising a disk and having a cutting structure, the cutting structure positioned to intersect a bottom surface of the disk and the shank, the cutting structure has a square cross-section formed by four walls intersecting the disk.

9. The cutting structure of claim 8 wherein each wall is defined by a straight edge relative to an adjacent wall.

10. The fastener of claim 8 each wall is defined by an arcuate edge relative to an adjacent wall.

11. The fastener of claim 10 wherein each arcuate edge comprises a one-eighth turn from a point intersecting the shank to a point intersecting the disk.

12. The fastener of claim 11 further including a third helical thread region formed spaced apart from the first helical thread region and having a third helical thread having a third effective diameter, the third region of the shank having a third shank diameter, the third helical thread having a third height relative to the third shank diameter.

13. The fastener of claim 12 including at least one of the following:
wherein the ratio of the first effective diameter to the second effective diameter is in a range of 1.3-1.02;
wherein the ratio of the first effective diameter to the third effective diameter is in a range of 1.3-1.02;
wherein the ratio of the first shank diameter to the second shank diameter is in a range of 1.25-1.02; or
wherein the ratio of the second shank diameter to the third shank diameter is in a range of 0.95-0.75.

14. The fastener of claim 12:
wherein the ratio of the first effective diameter to the second effective diameter is in a range of 1.3-1.02;
wherein the ratio of the first effective diameter to the third effective diameter is in a range of 1.4-1.02;
wherein the ratio of the first shank diameter to the second shank diameter is in a range of 1.25-1.02; and
wherein the ratio of the second shank diameter to the third shank diameter is in a range of 0.95-0.85.

15. A fastener, comprising:
a shank having a first pointed end, and a second head end, the shank having a base shank diameter;
a first helical thread region formed at the first pointed end and including the point having a first helical thread having a first effective diameter, the first region of the shank having a portion including a continuous first shank diameter, the first helical thread having a first height relative to the first diameter;
a sub-region of a second helical thread formed within the first helical thread region and to the first end, and the second helical thread having a second effective diameter, the shank in the sub-region having a continuous second shank diameter smaller than the first shank diameter, the second helical thread having a second height relative to the second shank diameter the second helical thread interspersed with the first helical thread such that each thread has a pitch, the pitch of the first helical thread matching the pitch of the second helical thread;

a third helical thread region formed spaced apart from the first helical thread region and between the head end and the first helical thread region, and having a third helical thread having a third effective diameter, the third region of the shank having a third continuous shank diameter, the third helical thread having a third height relative to the third shank diameter; and a head at the head end comprising a disk and having a cutting structure, the cutting structure positioned to intersect a bottom surface of the disk and the shank, the cutting structure has a square cross-section formed by four walls intersecting the disk.

16. The cutting structure of claim 15 wherein each wall is defined by a straight edge relative to an adjacent wall.

17. The fastener of claim 15 each wall is defined by an arcuate edge comprising a one-eighth turn from a point intersecting the shank to a point intersecting the disk.

18. The fastener of claim 15 wherein the bottom surface further includes four base edges extending from the disk away from the surface, the edges having a first end intersecting a middle of one of said walls, the based edge extending from the first end to an edge of the disk.

19. The fastener of claim 15 including at least one of the following:
  wherein the ratio of the first effective diameter to the second effective diameter is in a range of 1.3-1.03;
  Wherein the ratio of the first effective diameter to the third effective diameter is in a range of 1.4-1.03;
  Wherein the ratio of the first shank diameter to the second shank diameter is in a range of 1.25-1.02; or
  Wherein the ratio of the second shank diameter to the third shank diameter is in a range of 0.95-0.75.

* * * * *